Patented Aug. 5, 1952

2,606,189

UNITED STATES PATENT OFFICE 2,606,189

8-HYDROXYQUINOLINIUM DI-HYDROGEN PHOSPHATE AND METHOD OF PREPARATION

Nathaniel Grier, Brooklyn, N. Y., and Charles Casalbore, Passaic, N. J., assignors to Dar-Syn Laboratories, Inc., Hawthorne, N. J., a corporation of New Jersey No Drawing. Application October 17, 1950, Serial No. 190,660

8 Claims. (Cl. 260—286)

The present invention is directed to the phosphoric acid salt of 8-hydroxyquinoline. This application is a continuation-in-part of abandoned application Serial No. 28,726, filed May 22, 1948, entitled "8-Hydroxyquinolinium Di-Hydrogen Phosphate."

It has been known for a considerable time that 8-hydroxyquinoline is capable of forming salts with acids because of the basic character of the heterocyclic nitrogen therein. Polybasic acids are known to react with 8-hydroxyquinoline to form various salts; for example, sulphuric acid will react to form either the acid sulphate or the neutral sulphate. In the case of phosphoric acid, salts with the 8-hydroxyquinoline have been described in the literature. Such salts were triquinolinium phosphate and diquinolinium monosodium phosphate. However, the prior art has not described the monoquinolinium phosphate.

It is among the objects of the present invention to provide a process for producing the quinolinium di-hydrogen phosphate which is simple and highly efficient.

It is also among the objects of the present invention to provide a reaction product which is relatively pure and is adapted for various commercial uses.

The invention is based on the discovery that 8-hydroxyquinoline will react with phosphoric acid to form the monoquinolinium phosphate regardless of the molar ratio of the reactants, provided that the reaction is conducted in the presence of weak acids or weakly acidic substances, the ionization constants, Ka, of which are $10^{-3}$ or lower.

Phosphoric acid dissociates as follows:

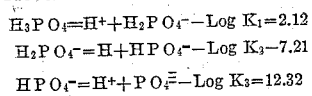

The following are specific examples of procedures for producing the compound:

Example I 14.5 gms. (0.100 mol) 8-hydroxyquinoline is dissolved in 50 c. c. warm glacial acetic acid. No heat is necessary for the reaction and the warm acid merely facilitates the solution. To this is added with stirring 12 gms. (0.104 mol) 85% phosphoric acid. The conditions are substantially anhydrous and the reaction takes place at room temperatures, namely, from about 18° to 24° C. During the stirring a yellow precipitate is rapidly formed with the evolution of heat due to salt formation. The reaction mixture is cooled to room temperature and the product is separated from the solution by suction filtration. It is washed with a small amount of glacial acetic acid and dried. A good yield is obtained, being about 22.5 grams. The melting point of the product is 185° to 187° C. The reaction is as follows:

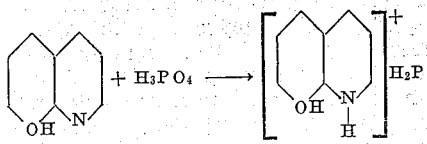

For analysis a sample of the above prepared mono 8-hydroxyquinolinium di-hydrogen phosphate was dissolved in twice its weight of water, the pH adjusted carefully to 7 using dilute sodium hydroxide. The resultant mixture was subjected to steam distillation until no evidence of 8-hydroxyquinoline was found in the distillate. The residue which consisted of only the phosphate salt was analyzed in the usual manner for phosphate.

$C_9H_7ON \cdot H_3PO_4$

|  | Per cent |
|---|---|
| Theoretical, $H_3PO_4$ | 40.33 |
| Found, $H_3PO_4$ | 40.25 |
|  | 40.38 |

The product is a crystalline yellow salt, more than 33% soluble in water at room temperature, weight/volume, and gives a weakly acidic solution in water.

Example II

A large excess of 8-hydroxyquinoline was used to illustrate the fact that only the mono salt is formed.

55 gms. (0.38 mol) 8-hydroxyquinoline were dissolved in 100 gms. warm glacial acetic acid. 12 gms. 85% phosphoric acid (0.10 mol) were added. Cooling and scratching caused precipitation. The product, after suction filtration, was washed wth glacial acetic acid and dried. Yield, 21 gms., M. P. 185–187° C. A mixed melting point with 8-hydroxyquinolinium di-hydrogen phosphate showed no depression. No neutral 8-hydroxyquinoline phosphate formed. All of the phosphoric acid originally added was precipitated as the mono 8-hydroxyquinolinium di-hydrogen phosphate. Analysis of the product confirmed this.

Example III 14.5 g. (0.10 mol) 8-hydroxyquinoline were dissolved in 50 c. c. propionic acid with the formation of an orange color. To this with cooling there were added 12 gms. 85% phosphoric acid. Immediate precipitation resulted. On further cooling and rubbing the product became granular. It was removed by suction-filtration, washed with a small amount of propionic acid, followed by ether. After thorough drying a yield of 23 gms. 8-hydroxyquinolinium di-hydrogen phosphate was obtained.

*Example IV*

14.5 g. (0.10 mol) 8-hydroxyquinoline were dissolved at room temperature in 75 c. c. ethyl acetoacetate (enol form is weakly acidic) with the formation of a yellow solution. Addition of 12 gms. 85% phosphoric acid caused the formation of a gummy precipitate. On cooling and rubbing a granular product was obtained. After suction-filtration, washing with ethyl acetoacetate followed by ether gave a final yield of 21.5 gms. 8-hydroxyquinolinium di-hydrogen phosphate after drying. Recrystallization from 96% alcohol gave crystals, M. P. 185–187° C.

*Example V*

14.5 g. (0.10 mol) 8-hydroxyquinoline were dissolved by heating in 50 c. c. meta cresol. With cooling 12 gms. 85% phosphoric acid were added. A supersaturated solution resulted. This was seeded with 8-hydroxyquinolinium di-hydrogen phosphate and cooled until complete precipitation resulted. The heavy moss was rubbed with an equal volume of ether and suction-filtered. It was thoroughly ether washed and dried. 24 gms. 8-hydroxyquinolinium di-hydrogen phosphate were obtained. On crystallization from glacial acetic acid it melted at 185–187° C.

The process is carried in the absence of any bases stronger than the 8-hydroxyquinoline, such as caustic soda. Such alkalis would preferentially combine with the phosphoric acid and interfere with the desired formation of the 8-hydroxyquinoline salt.

Mono 8-hydroxyquinolinium di-hydrogen phosphate is useful for the precipitation of metals and metallic ions. Further, because of the reserve acidity inherent in this salt it is useful for the preparation of buffer solutions.

There are numerous advantages inherent in the procedure in that the process is simple to conduct requiring no special heating or equipment. The yield of pure product is high, being at least 80%, and the mother liquor may be re-used for further reaction. Therefore, practically theoretical yields may eventually be obtained in commercial practice. This process is of especial value when the quantity of 8-hydroxyquinoline originally present is unknown. By reaction in such weakly acidic solvents e. g. glacial acetic acid, 8-hydroxyquinoline will form only one product, mono-8-hydroxyquinolinium di-hydrogen phosphate, independently of which component is present in molar excess.

In the above examples, the media were non-aqueous. But it is possible to operate the process in the presence of water. For instance, the process of Examples 1 or 2 may be conducted with aqueous acetic acid, the mono salt formed in the reaction remaining in solution. It may be recovered by evaporation of water, by the use of a solvent miscible with acetic acid and water such as acetone, by extracting the water as by the use of methyl ethyl ketone, and by other known expedients. The phosphoric acid may be in excess and the reaction mixture may have up to 3 or 4 mols thereof to 1 mol of 8-hydroxyquinoline, the salt formed precipitating from the solution. The order of addition of the reactants may be different from that described in the examples.

These and other changes may be made in the details of the invention, which is to be broadly construed and to be limited only by the character of the claims appended hereto.

We claim:

1. A method of making mono 8-hydroxyquinolinium di-hydrogen phosphate which comprises dissolving 8-hydroxyquinoline in a weakly acidic solvent having an ionization constant of not over $10^{-3}$ and mixing phosphoric acid therewith, whereby said mono phosphate is formed.

2. A method of making mono 8-hydroxyquinolinium di-hydrogen phosphate which comprises dissolving 8-hydroxyquinoline in a weakly acidic solvent having an ionization constant of not over $10^{-3}$ and mixing phosphoric acid therewith, whereby said mono phosphate is formed and is precipitated, and separating the precipitate from the remaining liquid.

3. A method of making mono 8-hydroxyquinolinium di-hydrogen phosphate which comprises dissolving 8-hydroxyquinoline in a weakly acidic solvent having an ionization constant of not over $10^{-3}$ and mixing phosphoric acid therewith, whereby said mono phosphate is formed and is precipitated, said solution being substantially anhydrous, and separating the precipitate from the remaining liquid.

4. A method of making mono 8-hydroxyquinolinium di-hydrogen phosphate which comprises dissolving 8-hydroxyquinoline in a weakly acidic solvent having an ionization constant of not over $10^{-3}$ and mixing phosphoric acid therewith, whereby said mono phosphate is formed, the reactants being in substantially equimolecular proportions.

5. A method of making mono 8-hydroxyquinolinium di-hydrogen phosphate which comprises dissolving 8-hydroxyquinoline in a weakly acidic solvent having an ionization constant of not over $10^{-3}$ and mixing phosphoric acid therewith, whereby said mono phosphate is formed, causing said phosphate to precipitate, cooling the mixture to room temperature, and separating the precipitate from the remaining liquid.

6. A method of making mono 8-hydroxyquinolinium di-hydrogen phosphate which comprises dissolving 8-hydroxyquinoline in glacial acetic acid, mixing therewith an approximately equimolecular quantity of phosphoric acid, whereby said product is precipitated, and separating said product from the remaining liquid, said product being substantially pure 8-hydroxyquinolinium di-hydrogen phosphate.

7. A method of making mono 8-hydroxyquinolinium di-hydrogen phosphate which comprises dissolving 8-hydroxyquinoline in a weakly acidic solvent having an ionization constant of not over $10^{-3}$ and mixing phosphoric acid therewith, said mixture being substantially free from bases stronger than 8-hydroxyquinoline, whereby said mono phosphate is formed.

8. A composition of matter which is mono 8-hydroxyquinolinium di-hydrogen phosphate having the following structural formula:

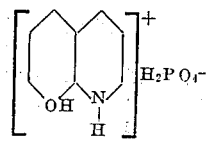

and having a slightly acid reaction.

NATHANIEL GRIER.
CHARLES CASALBORE.

No references cited.